(12) United States Patent
Bourque et al.

(10) Patent No.: US 8,600,577 B2
(45) Date of Patent: Dec. 3, 2013

(54) NAVIGATION SYSTEM AND METHODS FOR GENERATING ENHANCED SEARCH RESULTS

(75) Inventors: Francis Bourque, Mundelein, IL (US); Sanjay Gupta, Lakewood, IL (US); Mark Hansen, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 462 days.

(21) Appl. No.: 12/345,439

(22) Filed: Dec. 29, 2008

(65) Prior Publication Data
US 2010/0168994 A1    Jul. 1, 2010

(51) Int. Cl.
G05D 1/00    (2006.01)

(52) U.S. Cl.
USPC ............................................................ 701/2

(58) Field of Classification Search
USPC .................................. 701/208, 209; 715/738
See application file for complete search history.

(56) References Cited

U.S. PATENT DOCUMENTS

| | | | |
|---|---|---|---|
| 5,036,471 A | 7/1991 | Tamura et al. | |
| 5,850,618 A | 12/1998 | Suetsugu et al. | |
| 5,928,305 A | 7/1999 | Nomura | |
| 5,951,622 A | 9/1999 | Nomura | |
| 6,023,655 A | 2/2000 | Nomura | |
| 6,038,508 A | 3/2000 | Maekawa et al. | |
| 6,484,094 B1 | 11/2002 | Wako | |
| 6,976,027 B2 | 12/2005 | Cutlip | |
| 7,082,365 B2 * | 7/2006 | Sheha et al. | 701/209 |
| 7,132,596 B2 * | 11/2006 | Nakabo et al. | 84/615 |
| 7,353,109 B2 | 4/2008 | Han | |
| 2006/0122872 A1 | 6/2006 | Stevens et al. | |
| 2006/0284767 A1 | 12/2006 | Taylor | |
| 2006/0287810 A1 | 12/2006 | Sadri et al. | |
| 2007/0010942 A1 * | 1/2007 | Bill | 701/209 |
| 2007/0067099 A1 | 3/2007 | Ohashi et al. | |
| 2007/0276592 A1 | 11/2007 | Johnson et al. | |
| 2007/0299599 A1 | 12/2007 | Letchner et al. | |
| 2008/0005067 A1 | 1/2008 | Dumais et al. | |
| 2008/0077319 A1 | 3/2008 | Kato et al. | |
| 2008/0133130 A1 | 6/2008 | Okamoto | |
| 2009/0241061 A1 | 9/2009 | Asai et al. | |
| 2010/0168996 A1 | 7/2010 | Bourque et al. | |

FOREIGN PATENT DOCUMENTS

| | | |
|---|---|---|
| EP | 1467182 A1 | 10/2004 |
| EP | 1990789 A1 | 2/2006 |
| EP | 1691211 A2 | 8/2006 |
| EP | 2063226 A2 | 9/2008 |
| EP | 2000775 A1 | 12/2008 |

OTHER PUBLICATIONS

PCT Notification of Transmittal of the International Search Report and the Written Opinion of the International Searching Authority, or the Declaration, mailed Mar. 22, 2010, pp. 1-14, PCT/US2009/066565, European Patent Office.
Patel, N., Dash Express review; www.engadget.com; Mar. 27, 2008, 9 pages.

(Continued)

Primary Examiner — Michelle Le

(57) ABSTRACT

A navigation system and various methods of using the system are described herein. Search query results generated by the system are listed and prioritized based upon travel related information and contextual information. Intermediary locations can be accessed based upon prioritizing search queries.

20 Claims, 3 Drawing Sheets

(56) References Cited

OTHER PUBLICATIONS

Microsoft Windows Desktop Search; http://web.archive.org/web/20080908104536/http://www.microsoft.com/windows/products/winfamily/desktopsearch/default.mspx; Sep. 8, 2008 Snapshot; 1 page.
Yahoo Desktop Search—X1 (http://www.x1.com/); http://web.archive.org/web/20080523070115/http://www.x1.com; May 23, 2008 Snapshot; 1 page.
Google Search; http://web.archive.org/web/20081228065450/http://www.google.com; Dec. 28, 2008 Snapshot; 1 page.
Yahoo! Search; http://web.archive.org/web/20081227183913/http://yahoo.com; Dec. 27, 2008 Snapshot; 1 page.
Microsoft Live (http://www8.garmin.com/traffic/msn/index.jsp); http://web.archive.org/web/20081217025107/http://www8.garmin.com/traffic/msn/index.jsp; Dec. 17, 2008 Snapshot; 2 pages.
Dash Express (http://www.amazon.com/Dash-Express-Internet-Connected-Portable-Navigator/dp/B0014CIBWC); http://web.archive.org/web/20081227141347/http://www.amazon.com/Dash-Express-Internet-Connected-Portable-Navigator/dp/B0014CIBWC; Dec. 27, 2008 Snapshot; 9 pages.
Google Desktop Search; http://desktop.google.com; accessed Oct. 21, 2011; 3 pages.
Patent Cooperation Treaty, "PCT Search Report and Written Opinion of the International Searching Authority" for International Application No. PCT/US2010/048559 Dec. 3, 2010, 13 pages.

* cited by examiner

NAVIGATION SYSTEM AND METHODS FOR GENERATING ENHANCED SEARCH RESULTS

FIELD OF THE INVENTION

The present invention relates to systems and methods for guided navigation. More particularly, the present invention relates to navigation systems and methods for generating enhanced search query results when operating navigation systems.

BACKGROUND OF THE INVENTION

Navigation systems are known for identifying and displaying a desired geographic location, as illustrated on a map, as well as computing a route from a current location to a desired location. These systems are commonly found on automotive vehicles as well as encompassed within hand-held devices. It is often the case that navigation systems provide information relating to points of interest (POI), such as shopping, food, and business related locations. However, voluminous search query results are typically generated, which is inefficient and often ineffective for providing information relating to POIs. It would be advantageous for a navigation system to efficiently provide enhanced search query results for more effective searching.

SUMMARY OF THE INVENTION

In one aspect of the invention, a navigation system is provided with a graphical user interface configured for receiving and displaying travel related data. The system includes a map database containing geographic related data and a historical database containing geographic travel related historical data and contextual travel related historical data. Additionally, the system includes a search engine configured to perform a process for providing ranked search query results. The process can include the steps of: initiating a search query, generating a list of results based upon the search query; prioritizing the results based in-part upon data accessed from the historical database and map database, and displaying the list in the interface based upon the prioritizing.

In another aspect of the invention, a method for conveying enhanced search query results with a navigation system is provided. The method can include initiating a search query based at least in part upon a final destination, accessing a map database configured for storing geographic information, accessing historical travel related information from a relational database and accessing contextual travel related information from a relational database. The method can also include generating a list of intermediary destination results based at least in part upon the search query, prioritizing the list based at least in part upon historical and contextual travel related information and displaying the prioritized results on a navigation system graphical interface.

In yet another aspect of the invention, a navigation system that facilitates conveying enhanced query results is provided. The system can include an interface component that receives a query corresponding to geographical destination and a visual component that employs a search result based at least in part upon the query. The search results can be prioritized based upon historical travel data and travel-based contextual data.

In yet another aspect of the invention, a method of conveying search query results is provided. The can include includes initiating a search query based at least in part upon a final destination, accessing a map database, accessing historical travel related information from a database and accessing contextual travel related information from a database. Additionally, the method can include generating a list of intermediary destination results based at least in part upon the search query, historical travel related information and contextual travel related information and displaying the list on a graphical interface.

DETAILED DESCRIPTION

Figure 1:
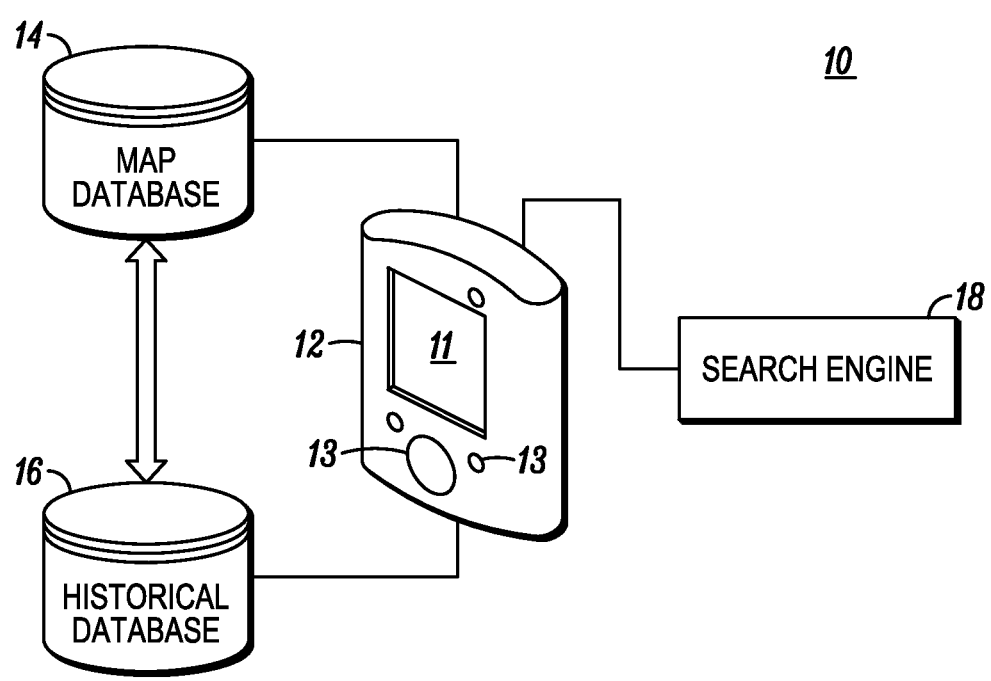
FIG. 1 is a block diagram representing a navigation system according to at least one embodiment of the present invention.

Referring to FIG. 1, a block diagram of an exemplary navigation system 10 is provided. The navigation system 10 includes a user interface 12, a map database 14, a historical database 16 and a search engine 18. The system 10 can be a smart phone, mobile computing device, affixed within a vehicle, or another suitable configuration. In the present embodiment, the interface 12 has a graphic display 11 and manual data entry keypad 13 which is generally known in the art and suitable for the present system 10. Alternatively, the interface 12 can have a touch screen, QWERTY style keypad, wireless data entry, or voice activation and recognition. The map database 14 and historical database 16 are relational databases accessed by the search engine 18. Alternatively, the databases 14, 16 can be a single database accessed by the search engine 18. Data provided within the databases 14, 16 are utilized for generating travel routes and providing suggested travel destinations based at least in part upon a user's search query and travel related data described further below. The search engine 18 is a processing device that is configured to execute computer executable code. Alternatively, the search engine 18 is a microprocessor.

The map database 14 includes information relating to geographical roadways and routes. A variety of commercially available databases containing map and atlas related information are suitable. It is contemplated that the map database 14 includes additional information that is relevant to the user and previously performed search queries. By example, additional information can include sociological data, such as neighborhood crime rates, ethnicity demographics and average household incomes, and industrial data, such as type of businesses, shopping related data, and potentially hazardous industrial locations. Additionally, the generation of sociological and industrial profiles for neighborhoods or geographic regions is contemplated. Values assigned to various information within each profile can affect the prioritization and ranking of search query results. Utilizing the map database 14, the search engine 18 can perform a reverse address search to identify businesses and other POIs within close proximity of the current location. The interface 12 can be programmed to prompt a user to identify the current location by the POI visited. If a user identifies one or more POIs the information is updated within the historical database 16. Alternatively, results having a higher ranking than the result chosen by a user are also recorded in the database 16 and can be assigned a lower ranking if the same search query is subsequently performed.

The historical database 16 includes information relating to previous travel and other behavior selections and circumstances encountered by one or more users in the past. Such information can be conceptually identified as separate, including geographic travel related historical data and contextual travel related historical data. The contextual travel related data includes information selected from the group including frequency of destination visits, search query time, time-of-day associated with previous search queries, current directional travel, weather conditions, traffic conditions, current time of day and frequency of current route. Contextual travel related historical data can also include information stored within the database 16 that represent associations and/or inferences extrapolated from historical and non-historical related data. The historical database can include information selected from the group comprising previous search queries, prior travel routes, prior locations visited, type of prior location visited and deviation distance from route for previously chosen locations. Additionally, the historical database 16 can include previous destination specific information, which can affect the ranking and prioritization of that particular result. By example, the operating hours of a previously visited business is stored in the database 16. If the search query is performed outside of the business' operating hours, or the estimated time of travel to the destination added to query time would be outside of the operating hours, then the destination is given a lower rank or removed from the results completely.

Historical database 16 data can also be harvested from a mobile device, such as cell phones, smart phones, PDAs, computers, and other electronic data storing devices. A wireless, such as Bluetooth, or wired connection provides access to information for use in prioritizing search queries. By example, previously dialed numbers and frequency of calls made and received can be stored in the database 16 and used for prioritizing search results. Additionally, location and travel information from calls made or received from a mobile phone is contemplated. Higher call frequency associated with a particular number and location can affect the prioritization by assigning a higher rank to results in closer proximity to that particular location. The historical database 16 can generate associations between different types of data and generate inferences, which can affect prioritization of search results, based upon the associations. By example, a search for "Motorola Phone" resulted in a user traveling to "Best Buy". If the same search is performed at a subsequent time, results similar to "Best Buy" will be prioritized based upon the inference made from the previous search. It is contemplated that a mobile device, such as a Bluetooth enabled cell phone, can be used to identify a user, which the system 10 associates with stored historical data. Alternatively, a user can input their identity manually through the interface 12.

Figure 2:
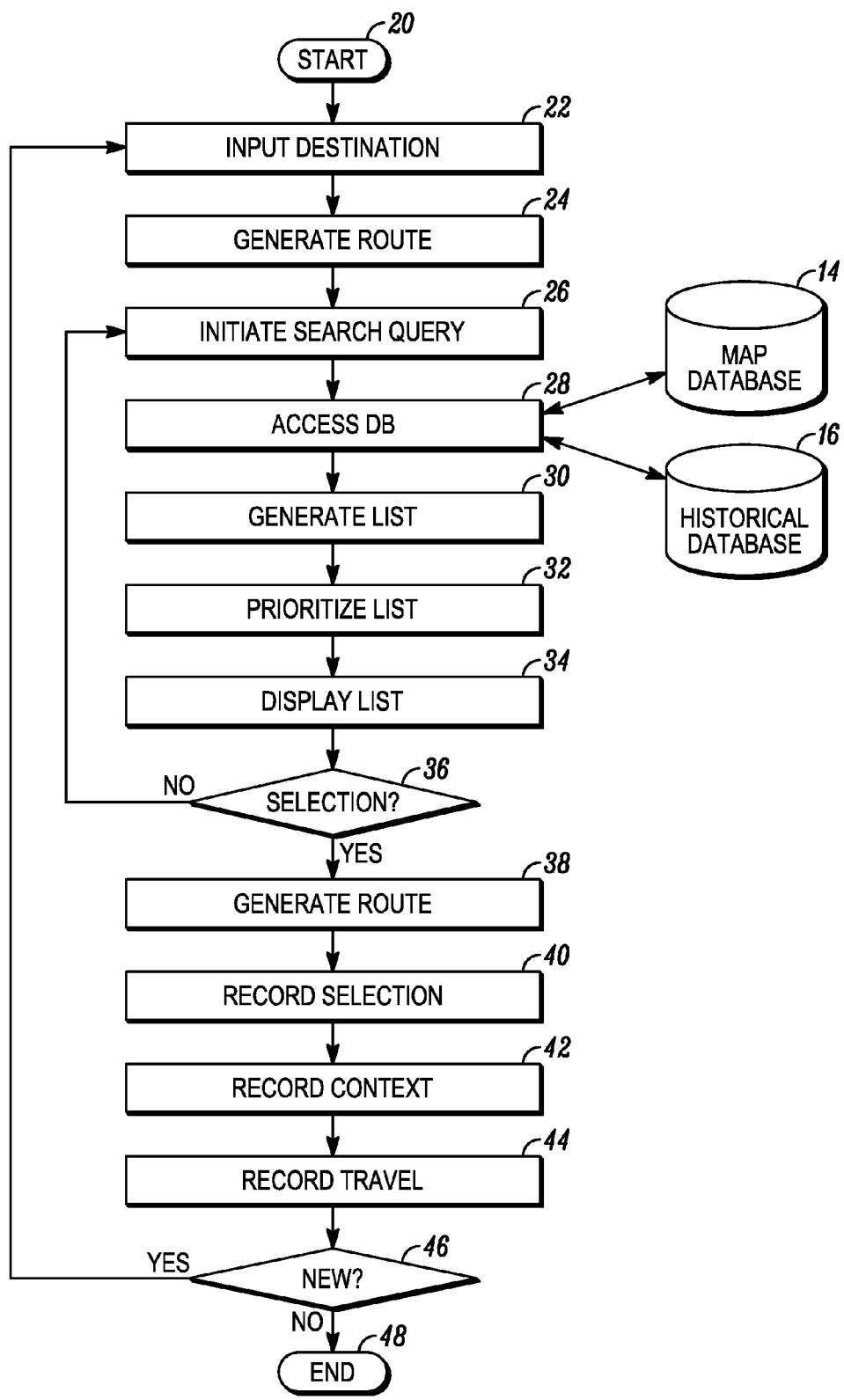
FIG. 2 is a flow diagram representing a process for generating search query results according to at least one embodiment of the present invention.
Figure 3:
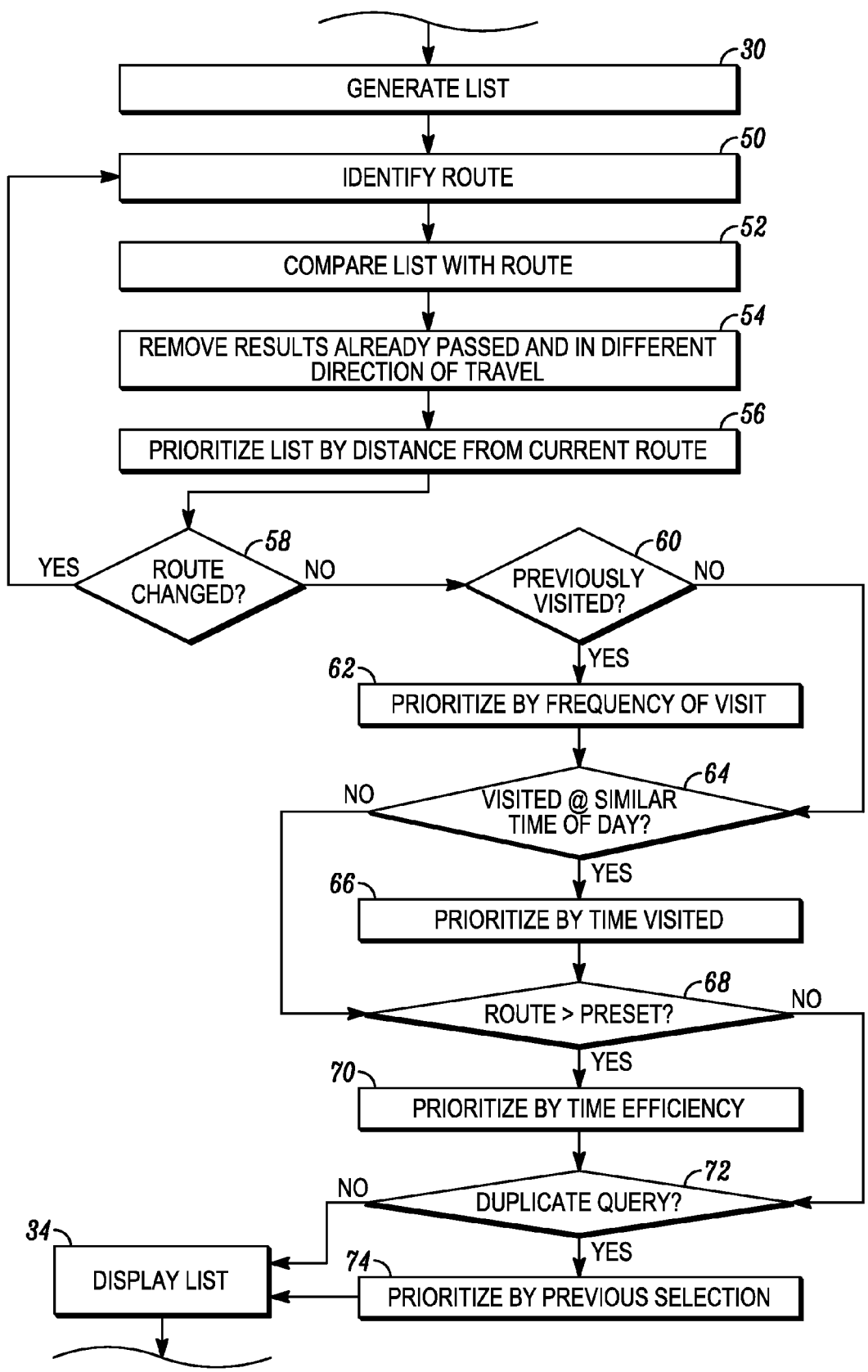
FIG. 3 is a flow diagram representing a process for prioritizing search query results according to at least one embodiment of the present invention.

Now referring to FIGS. 2 and 3, an exemplary process is provided for execution of enhanced search queries. The system 10 is initiated at step 20 and a user provides a desired final destination to the interface 12 at step 22. A route from the present location to the final destination is generated at step 24 from map database 14. At step 26, an intermediary location or destination search query is initiated by a user. Based upon the search query, the system 10 accesses at least one database at step 28. By example, map database 14 and historical database 16 can be accessed concurrently or sequentially at step 28. Alternatively, the system 10 accesses more than two databases concurrently or in sequence and/or on a repeated basis. After accessing the database at step 28, a list of intermediary search results is generated at step 30. The generated list is then prioritized at step 32 and displayed at step 34. A decision whether to select one of the intermediary destinations in the list is performed at step 36. In the event that a selection is not made, a new search query is initiated at step 26. If an intermediary destination is chosen at step 36, then an intermediary route is generated at step 38. The map database 14 is accessed when generating travel routes. The intermediary route is in combination with the final destination route, thereby providing directional instructions for a user to travel to an intermediary location followed by directions to the final destination.

Further, as shown, intermediary destinations and routes are recorded and indexed within a database (e.g. the historical database 16) at step 40. Travel related contextual information is recorded and indexed within a database at step 42. Contextual information includes data relating to previous query selections, the circumstances surrounding the selections, and the geographic location of places visited. Actual travel data, including routes and destinations, is recorded at step 44. It is contemplated that the travel related data recorded in steps 40, 42 and 44 can occur independent of one another, and independent of other steps in the process. If a new search is required at step 46, then a search query is initiated at step 26. Alternatively, the process is terminated at step 48.

The process of prioritization at step 32 (see steps 50-74) is provided in greater detail within FIG. 3, which provides a process for prioritizing enhanced query results. Following the generation of a list at step 30 the final destination route is identified at step 50. A comparison of the result list and the final destination route is performed at step 52. Results within the list that have already been passed are located in a different direction with respect to the final destination route are removed from the list at step 54. Alternatively, the system 10 can remove results which are in the opposite direction or different direction as compared to the current direction being traveled at the time a query is initiated. The list is then prioritized based upon the distance from the final destination route at step 56. Items in the list that are closer to the route are assigned a higher prioritization value, and are ranked accordingly. If the route has changed at step 58, then the route is identified at step 50. Alternatively, the system dynamically identifies when the final destination route has changed and recalculates the route. If the route has not changed, then further steps are performed to prioritize a list. In an alternative embodiment, prioritization steps are reconfigured to a different sequence, thereby resulting in a different listing of preferred query results.

In an alternative embodiment, the prioritization 32 is based upon any data available within the map database 14 and the historical database 16. Values assigned to query results based upon the database 14, 16 information are assigned a positive, negative or null value. By example, businesses visited once and in the same category of subsequently visited businesses, are assigned a negative value. Negative values lower the result ranking and positive values increase the result ranking. Additionally, query results located in a region with a high crime rate are assigned a negative value. Particular users can be adverse to risk, which would rank the same business in a high crime area lower than one in a more affluent area, even though the business in the high crime area is closer to the user's present location. Data stored within the historical database 16 generally is assigned higher positive value than static data stored within the map database 14, as the historical data is generally more relevant to the user. Alternatively, it is contemplated that a threshold amount of user associated historical data is advantageous for ranking search queries i.e. a new system 10 will provide less relevant results than a system 10 having, by example, more than 2 months worth of historical data. Alternatively, if historical data is not associated with a first user, historical data associated with a second user can be used for purposes of result prioritization for the first user. In the event of multiple users, the first user can choose which alternative user's historical data, or a blending of two or more user's data, to use when performing search queries. In yet another alternative embodiment, data is harvested from a user's mobile device and then used to populate the historical database 16 for that particular user. Information such as email addresses, phone numbers, additional contact information and calendar entries can be stored in the database 16 and used for prioritizing search query results.

In particular, a database is queried to identify at step 60 whether the remaining items in the list have been previously visited. If an item has been previously visited, the item is prioritized based upon the frequency of visits. The system default assigns locations visited with greater frequency a higher prioritization value and ranked accordingly. Alternatively, the locations not previously visited or those having low frequency can be assigned a higher value and prioritized accordingly. A comparison to the current time of day and the time of day locations on the list were previously visited is performed at step 64. Locations previously visited are prioritized based upon their proximity to the current time of day at step 66.

A threshold or preset estimated travel time is also identified. If the estimated travel time is greater than the threshold value at step 68, then the listed items are prioritized based upon time efficiency at step 70. By example, if the threshold value is 45 minutes, then the intermediary destination items are prioritized based upon their estimated deviation time from the final destination route. Alternatively, users who are traveling for sight-seeing purposes can reset the default, such that locations with greater deviation from the final destination have higher prioritization. If the query has been performed previously 72, then the locations visited immediately subsequent to the same or similar previous query are prioritized at step 74. If query has not been previously performed, then the prioritized list is displayed at step 34

The historical database 16 is populated with updated information after a change event. A change event occurs whenever a new query is selected, the user has traveled to an alternative destination, or additional travel related historical or contextual information is provided to the interface 12 or databases 14,16. As a result, the system 10 adapts the query result ranking and prioritizing based at least in part upon a user's travel and contextual behavior. It is contemplated that the system 10 can be associated with more than one user. While initiating a search query the user is identified and historical and contextual information associated with that user are accessed from at least one database. The results are prioritized based in part upon the data associated with the user. By example, a one-vehicle household could have two or more drivers with varying personal preferences. The navigation system 10 provides a method for enhanced prioritization of search query results that is based in part upon a particular individual's preferences extrapolated from historical travel and contextual information. By example, a "fast food" query could prioritize "McDonald's" for a first user, while prioritizing "Burger King" for a second user.

The final destination route can be analyzed based upon contextual information, such as the approximate distance or estimated length of time and type of driving (By example, Interstate, County Highway, or City Roadway). Query results are prioritized based at least in part upon the route context. By example, a longer route on the Interstate can prioritize fast-food restaurants located proximal to the Interstate higher than a five-star restaurant located distal to the Interstate.

The intermediary destination is a location other than a location at the time of generating the search and the final destination. The intermediary location can be located proximal or distal to the final destination route. Once an intermediary location is selected and a route is generated, the final destination route is recalculated based upon the intermediary location. Traffic information, road construction, preferred routes, and alternative roadway information can be utilized in generating prioritized route. A user can optionally select alternative methods of transportation, such as walking or bicycle travel, which can alter the route accordingly.

Alternatively, a method of conveying search query results includes initiating a search query based at least in part upon a final destination. The final destination is selected by a user. After selecting the target or final destination a map database and historical database are accessed. The historical database includes historical travel related information and contextual travel related information. A list of intermediary destination results is generated based at least in part upon the search query, historical travel related information and contextual travel related information. After the intermediary results have been generated they are displayed within a graphical interface, such as one provided by a mobile navigation system. The user can select any of the intermediary destinations, which are distinct from a current location and the final destination. The map database and historical database can be accessed remotely, such as through a GPS or other wireless method, or the databases can be integral to the navigation system. Databases integral to a navigation device can be regularly updated through wired or wireless communication with a supplied database (not shown).

In an alternative embodiment, the system 10 allows a user to provide a search query to the interface 12 representing a combination of search criteria. The query is proofed by the search engine 18 for typos or misspellings, and alternative keywords are suggested if a discrepancy is discovered. The combined search query can be compared with more than one database sequentially or concurrently. A list of POIs are provided based in part upon the keywords selected, proximity metrics to a final destination and the structure associated with the databases. The search query can be referred to as an unstructured search query, which provides flexibility and greater ease of use.

In yet another alternative embodiment, the system 10 detects whether music is currently being played and identifies the music. Alternatively, the system 10 can be logically connected to the source of the music, such as a radio providing current music details, satellite radio, and CD/MP3 players. Identification of the music can take several alternative forms, such as identifying the actual song through voice/word recognition and searching a music library for the identified lyrics. Alternatively, the general genre of the music can be identified based upon the composition and compilation of notes. After identifying the music being played, a mood value is assigned based upon the genre and type of music being played. For example, if a Mozart violin concerto is identified, then the system 10 could assign a mellow or subdued mood value. The mood value is then used to prioritize the search query results. By example, if a user was searching for a restaurant while a mellow or subdued mood value was assigned, a four-star restaurant would be prioritized higher than a fast-food restaurant. Alternatively, the mood value can be assigned based upon music previously played in combination with music played concurrently with the search query initiation. In this alternative embodiment the mood value is based upon two or more distinctly identified musical compilations.

To further consider the system and methods described herein, several search query examples are provided. These are merely exemplary and not intended to limit the scope of the claims provided herein. It is further contemplated that the invention can encompass a variety of other scenarios.

SEARCH QUERY EXAMPLE 1

At approximately 6:00 A.M. on a Wednesday during the winter a user enters a vehicle and enters a search query including the keyword "Fast food" and selects an option for close proximity to a final destination, which is identified as "work". The search engine identifies the search query and compares the query to historical query information contained within one or more databases. After the comparison is complete the search engine generates a prioritized list of fast food destination within close proximity to the user's preferred route to work. "Dunkin Donuts" is at the top of the list, followed by several other fast food restaurants. The search engine identified the user's contextual information, including location upon query initiation, time of day, day of week and season. After comparing the database with the user's query and contextual information, it was identified that the user had traveled to Dunkin Donuts 12 previous times during the work week, at approximately 6:00 A.M., during the winter while on his way to work after initiating the same or similar query. The user had previously traveled to "Starbucks" only 3 times, and therefore this location had been assigned a lower priority value.

SEARCH QUERY EXAMPLE 2

A search is initiated containing the keywords "Restaurants in Chicago." After initiating the query a map database is accessed and a comparison of the keywords is performed with respect to information contained within a historical database. A list of restaurants in Chicago is provided ranked by the frequency of visits to a particular restaurant, the day of week and time of day associated with the current query and prior visits to the results. Traffic data can be collected based upon the time of day and day of week to minimize the travel time to a location, and the list can be prioritized based upon the estimated travel time. Combination of historical, contextual and traffic information relating to a particular search query can provide a list of enhanced search results. The search results represent a list of potential intermediary destinations. It is conceived that an initial and final destination are one in the same, while the intermediary destination is a target destination within a round-trip travel sequence.

SEARCH QUERY EXAMPLE 3

A search query is initiated for a brand of navigation systems, such as "Motorola." The search is performed and a generated list of possible businesses offering Motorola® navigation systems for sale is provided. The businesses can include electronic stores, department stores, travel-specific businesses, and alternative locations that carry Motorola® products. Businesses are prioritized based upon frequency of visit, location proximity, and other contextual and historical information. Searching for a preferred brand, such as Motorola® navigation systems, will return businesses that are associated with selling and servicing the preferred product brand.

It is specifically intended that the present invention not be limited to the embodiments and illustrations contained herein, but rather that the present invention also include modified forms of those embodiments including portions of the embodiments and combinations of elements of different embodiments as come within the scope of the following claims.

The invention claimed is:

1. A navigation system comprising:
    a graphical user interface configured for receiving and displaying travel related data;
    a map database containing geographic related data;
    a historical database containing historical travel related data and contextual travel related data, wherein the contextual travel related data includes first information concerning frequency of destination visits; and
    a search engine configured to perform a process for providing ranked search query results, the process comprising the steps of:
        initiating a search query, wherein an indication of a final destination selected by a user is received prior to the initiating of the search query;
        accessing the map database and the historical database so as to retrieve at least some of the geographic related data, the historical travel related data, and the contextual travel related data including the first information;
        generating a list of results based upon the search query;
        prioritizing the results based in-part upon the at least some of the geographic related data, the historical travel related data, and the contextual travel related data including the first information accessed from the historical database and map database, wherein the prioritizing is determined at least in part by the time of day associated with the search query and further based at least in part upon prior travel data;
        displaying the list in the interface based upon the prioritizing, wherein the list does not include at least one of the results that was removed from the list because at least one location of the at least one result has already been passed en route to the final destination; and
        upon there being a selection of a first of the results displayed in the list, further generating based upon the at least some geographic related data an intermediate route to an intermediate destination corresponding to the selected first result and further providing the intermediate route in addition to directions to the final destination;
        wherein at least one portion of the prioritizing is performed an additional time prior to the displaying of the list if a final destination route changes.

2. The navigation system according to claim 1, wherein the contextual travel related data additionally includes additional information selected from the group comprising search query time, time-of-day associated with previous search queries, current directional travel, weather conditions, traffic conditions, current time of day and frequency of current route.

3. The navigation system according to claim 2, wherein the historical database includes information selected from the group consisting of previous search queries, prior travel routes, prior locations visited, type of prior location visited and deviation distance from route for previously chosen locations.

4. The navigation system according to claim 3, wherein the results are prioritized and listed based at least in part upon previous travel and query selections.

5. A method of conveying search query results comprising the steps of:

initiating a search query based at least in part upon a final destination, wherein an indication of the final destination selected by a user is received prior to the initiating of the search query;

accessing a map database to retrieve geographical map related information;

accessing an additional database to retrieve historical travel related information;

accessing the additional database to retrieve contextual travel related information, wherein the contextual travel related information includes both (i) frequency of destination visit data and (ii) additional data concerning time-of-day associated with previous search queries;

generating by way of a processing device a list of prioritized intermediary destination results based at least in part upon the search query, historical travel related information and contextual travel related information including the frequency of destination visits data, the time of day associated with the search query and prior travel data;

displaying the list on a graphical interface, wherein the list does not include at least one of the results that was removed from the list because at least one location of the at least one result has already been passed en route to the final destination; and upon there being a selection of a first of the results displayed in the list, further generating based upon the geographical map related information an intermediate route to an intermediary destination corresponding to the selected first result and further providing the intermediate route in addition to directions to the final destination.

6. The method according to claim 5, wherein a prioritizing of the list of prioritized intermediary destination results is determined at least in part by the distance associated with the final destination.

7. The method according to claim 6, wherein the geographic information includes roadway information.

8. The method according to claim 7, wherein the prioritizing is determined at least in part by locations visited within about 1 hour of the search query.

9. The method according to claim 8, wherein the prioritizing is determined at least in part by music played concurrent with the search query.

10. The method according to claim 9, wherein the intermediary destination is proximal to a final destination route.

11. The method according to claim 9, wherein the intermediary destination is distal to a final destination route.

12. The method according to claim 5, wherein the graphical interface is a navigation system.

13. The method according to claim 12, wherein the intermediary destination is a location other than a starting location and the final destination.

14. The method according to claim 13, further comprising the steps of identifying the user and accessing data from a database associated with the user.

15. The method according to claim 14, wherein the database is at a remote location and the accessing is performed wirelessly.

16. The method according to claim 15, wherein the identifying comprises accessing a wireless device associated with the user.

17. The navigation system according to claim 4, wherein the additional information includes the time-of-day associated with previous search queries.

18. The method of claim 17, wherein at least one prioritizing operation is performed an additional time prior to the displaying of the list if a final destination route changes.

19. The method of claim 18, wherein at least some of the historical travel related data is associated with an additional user that is other than the user for whom the prioritizing is being performed.

20. The navigation system according to claim 13, wherein the historical database is configured to identify music recently played by the user and assigns a mood value to the music, wherein the prioritizing is at least in part based upon the mood value.

* * * * *